United States Patent
Huang et al.

(10) Patent No.: US 9,614,948 B2
(45) Date of Patent: Apr. 4, 2017

(54) TELEPHONE AND AUDIO CONTROLLING METHOD THEREOF

(71) Applicant: Wistron Corporation, New Taipei (TW)

(72) Inventors: Shih-Chuan Huang, New Taipei (TW); Hsin-Chun Lee, New Taipei (TW); Chih-Hao Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 66 days.

(21) Appl. No.: 14/641,438

(22) Filed: Mar. 9, 2015

(65) Prior Publication Data

US 2016/0173695 A1   Jun. 16, 2016

(30) Foreign Application Priority Data

Dec. 16, 2014 (TW) .............................. 103143838 A

(51) Int. Cl.
*G06F 17/00* (2006.01)
*H04M 1/725* (2006.01)
*H04M 1/253* (2006.01)

(52) U.S. Cl.
CPC ...... *H04M 1/72527* (2013.01); *H04M 1/2535* (2013.01)

(58) Field of Classification Search
CPC ........................ H04M 1/2535; H04M 1/72527
USPC ............................................................ 700/94
See application file for complete search history.

(56) References Cited

U.S. PATENT DOCUMENTS

| | | | | |
|---|---|---|---|---|
| 7,366,577 B2* | 4/2008 | DiSanza | ............ | H04R 29/001 381/123 |
| 7,579,832 B1* | 8/2009 | Blackburn | ............... | H04R 3/00 324/300 |
| 7,916,875 B2* | 3/2011 | Kanji | ..................... | H01R 29/00 381/58 |
| 2004/0260846 A1* | 12/2004 | Stephan | .................. | G06F 3/162 710/10 |
| 2007/0133826 A1* | 6/2007 | Burk | ..................... | H04R 3/005 381/122 |

(Continued)

OTHER PUBLICATIONS

MAXIM 98090 codec; available for sale at least Aug. 2013.*

(Continued)

*Primary Examiner* — Paul McCord
(74) *Attorney, Agent, or Firm* — Jianq Chyun IP Office

(57) ABSTRACT

A telephone and an audio control method thereof are provided. The telephone includes a connector, a detecting circuit and an audio control unit. The connector connects an audio transceiver. The detecting circuit couples the connector, and generates a detecting voltage by detecting the audio transceiver through the connector. The audio controlling unit couples the detecting circuit and the connector. The audio control unit includes an analog-to-digital converter, an audio codec and a processing unit. The analog-to-digital converter is configured to covert the detecting voltage into a digital code. The audio codec provides at least two audio configurations. The processing unit identifies the audio transceiver according to the digital code, and controls the audio codec to switch to the audio configuration adapted to the identified audio transceiver to process audio data of the audio transceiver.

9 Claims, 3 Drawing Sheets

(56) References Cited

U.S. PATENT DOCUMENTS

| | | | | |
|---|---|---|---|---|
| 2009/0179768 A1* | 7/2009 | Sander | .................... | H04M 1/05 340/13.27 |
| 2009/0274312 A1* | 11/2009 | Howard | ............... | H04R 29/003 381/58 |
| 2014/0093103 A1* | 4/2014 | Breece, III | ................ | H03F 3/68 381/120 |
| 2014/0233741 A1* | 8/2014 | Gustavsson | .............. | H04R 5/04 381/58 |
| 2015/0124979 A1* | 5/2015 | Chien | .................... | H04R 29/00 381/58 |

OTHER PUBLICATIONS

"Office Action of Taiwan Counterpart Application" with partial English translation, issued on Aug. 8, 2016, p. 1-15, in which the listed references were cited.

\* cited by examiner

TELEPHONE AND AUDIO CONTROLLING METHOD THEREOF

CROSS-REFERENCE TO RELATED APPLICATION

This application claims the priority benefit of Taiwan application serial no. 103143838, filed on Dec. 16, 2014. The entirety of the above-mentioned patent application is hereby incorporated by reference herein and made a part of this specification.

BACKGROUND

Technical Field

The invention relates to a telephone, and particularly relates to a telephone having a connector and an audio codec and an audio control method thereof.

Related Art

Due to popularity of the Internet, a technique of implementing voice services through data transmission between Internet protocol (IP) addresses of the Internet is developed in recent years, and a conventional telephone voice dialing mode is integrated with the Internet. The integration is to compress and convert analog voice data into digital data suitable for computer processing, and transmit the digital data between a voice sending end and a voice receiving end through network packets. The aforementioned method of implementing voice service between the IP addresses through data transmission is also referred to as a voice over IP (which is referred to as VOIP hereinafter).

Initially, the VOIP is implemented through a PC-to-PC mode. Namely, a user uses a PC to log in a server of a service provider by using VOIP software (for example, Skype) to implement remote calling. However, along with development of the VOIP and as a network charging mode is changed to a monthly charging mode, hardware manufacturers start to manufacture VOIP-exclusive telephones (which is referred to as IP phones hereinafter) to facilitate the users to easily use the VOIP services.

FIG. 1 is a schematic diagram of a conventional IP phone and a corresponding audio transceiver. Referring to FIG. 1, generally, the IP phone 100 provides two connectors (for example, a connector 101 and a connector 102 shown in FIG. 1) to respectively support a handset 110 and a headset 120. The handset 110 or the headset 120 can be connected to the IP phone 100 through the corresponding connectors to facilitate the user making a phone call. However, under a current trend of lightness and thinness of electronic apparatuses, to scale down a hardware structure and a volume of the IP phone and maintain a good voice quality thereof are development targets of related practitioners.

SUMMARY

The invention is directed to a telephone and an audio control method thereof, by which a single connector is capable of supporting audio processing of different audio transceivers.

An embodiment of the invention provides a telephone including a connector, a detecting circuit and an audio control unit. The connector is connected to an audio transceiver. The detecting circuit is coupled to the connector, and detects the audio transceiver through the connector to generate a detecting voltage. The audio control unit includes an analog-to-digital converter, an audio codec and a processing unit. The analog-to-digital converter is coupled to the detecting circuit and is configured to covert the detecting voltage into a digital code. The audio codec is coupled to the detecting circuit and provides at least two audio configurations. The processing unit is coupled to the analog-to-digital converter and the audio codec, and identifies the audio transceiver according to the digital code, and controls the audio codec to switch to the audio configuration adapted to the identified audio transceiver to process an audio of the audio transceiver.

An embodiment of the invention provides an audio control method for a telephone having a connector and an audio codec. The audio codec provides at least two audio configurations. The method includes following steps. An audio transceiver connected to the connector is detected to generate a detecting voltage. The detecting voltage is converted into a digital code. The audio transceiver is identified according to the digital code, and the audio codec is controlled to switch to the audio configuration adapted to the identified audio transceiver to process an audio of the audio transceiver.

According to the above descriptions, in the telephone and the audio control method of the invention, an audio transceiver connected to the telephone such as a handset or a headset is detected to generate a corresponding detecting voltage, so as to identify the audio transceiver, such that the audio codec is controlled to switch to the audio configuration adapted to the identified audio transceiver to process audio data of the audio transceiver. In this way, at least two types of the audio transceivers connected to the telephone can be identified through a single connector, such that a good voice quality is maintained under a premise of reducing a whole volume of the telephone and reducing a mechanism and circuit design cost of the telephone.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
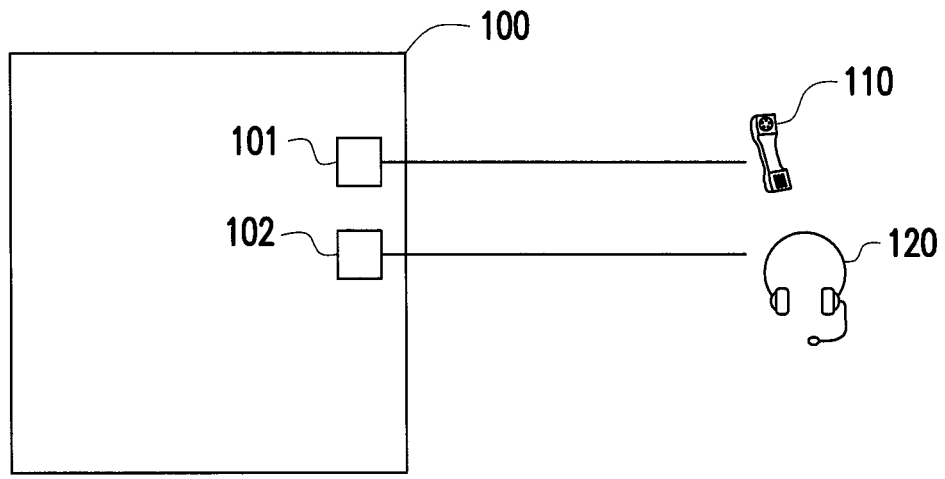
FIG. 1 is a schematic diagram of a conventional IP phone and a corresponding audio transceiver.
Figure 2:
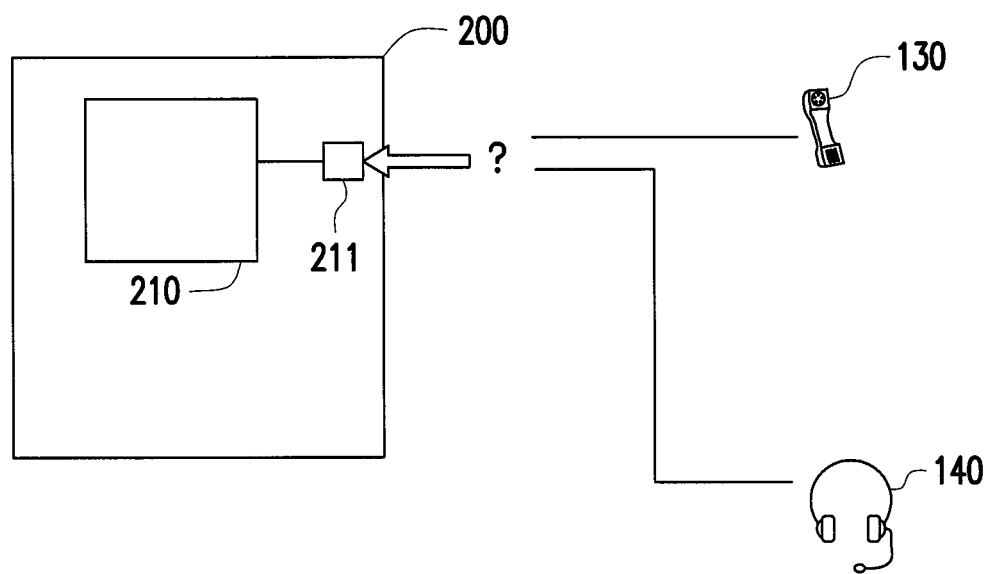
FIG. 2 is a schematic diagram illustrating a connection between a telephone and audio transceivers according to an embodiment of the invention.

FIG. 2 is a schematic diagram illustrating a connection between a telephone and audio transceivers according to an embodiment of the invention. Referring to FIG. 2, in the present embodiment of the invention, the telephone 200 is, for example, an IP phone, which includes an audio control unit 210 and a connector 211. The audio control unit 210 is used for determining whether a first audio transceiver (for example, a handset) 130 or a second audio transceiver (for example, a headset) 140 is inserted into the connector 211, so as to use an audio configuration corresponding to the identified audio transceiver to process audio data of the audio transceiver according to the determination result. In other words, the telephone and the audio control method of the invention can provide the corresponding audio configuration according to the type of the audio transceiver inserted into the connector without using a button, such that a generated audio effect can be matched to the audio transceiver.

It should be noticed that in the present embodiment, the telephone 200 is used to describe the concept of the invention, though the invention is not limited thereto. For example, in other embodiments, those skilled in the art can design the telephone capable of connecting different types of the audio transceivers according to the concept of the invention. Moreover, in the present embodiment, the first audio transceiver 130 is, for example, a handset, and the second audio transceiver 140 is, for example, a headset, though the invention is not limited thereto. For example, in other embodiments, the first audio transceiver 130 and the second audio transceiver 140 can be respectively a headset, a handset or other audio transceivers suitable for the phone 200.

Figure 3:
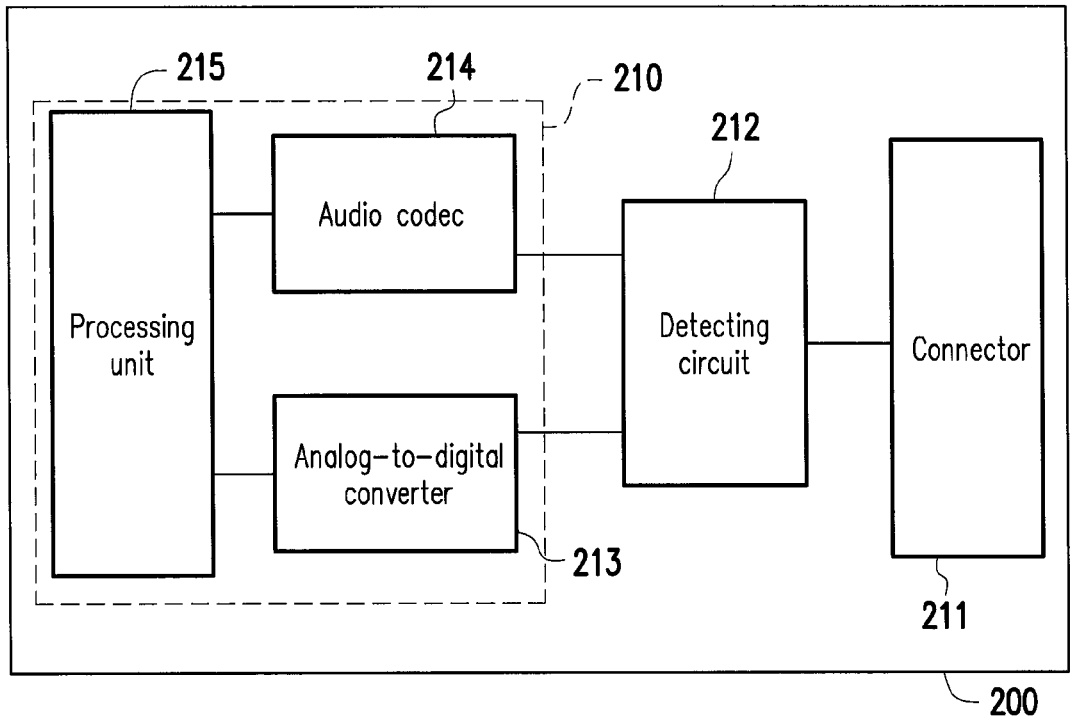
FIG. 3 is a block diagram of a telephone according to an embodiment of the invention.
Figure 4:
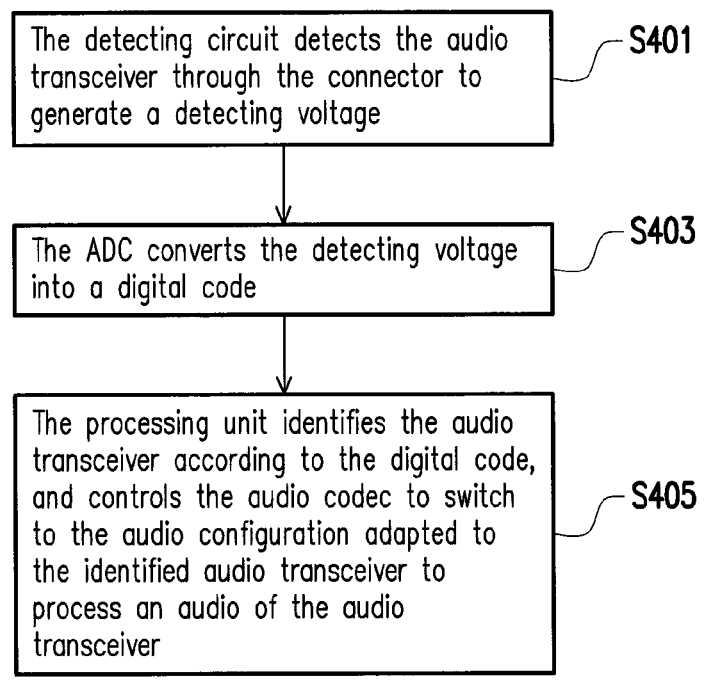
FIG. 4 is a flowchart illustrating operations of an audio control unit according to an embodiment of the invention.

FIG. 3 is a block diagram of the telephone according to an embodiment of the invention. FIG. 4 is a flowchart illustrating operation of the audio control unit according to an embodiment of the invention. A basic concept of the audio control method of the invention is described below with reference of FIG. 3 and FIG. 4. Referring to FIG. 3, in the present embodiment, the telephone 200 includes a connector 211, a detecting circuit 212 and an audio control unit 210 (encircled by a dotted line frame). The audio control unit 210 includes an analog-to-digital converter (refers to ADC hereinafter) 213, an audio codec 214 and a processing unit 215. The connector 211 is coupled to the detecting circuit 212, and the connector 211 is used for connecting the audio transceiver. The detecting circuit 212 is coupled to the connector 211, the ADC 213 and the audio codec 214. The ADC 213 is coupled to the processing unit 215 and the detecting circuit 212. The audio codec 214 is coupled to the processing unit 215 and the detecting circuit 212.

In the present embodiment, a number of the connector 211 is one, and the connector 211 is used for connecting the telephone 200 with different audio transceivers (for example, the first audio transceiver and the second audio transceiver). The connector 211 is, for example, a connection interface (for example, a RJ9 interface) complied with a registered jack (RJ) protocol, though the invention is not limited thereto. For example, in other embodiments, the connector 211 can be a connection interface complied with a universal serial bus (USB) protocol or other suitable connection interface. Particularly, manufactures can also design the connector and a data transmission standard/protocol and a hardware structure of the audio transceiver corresponding to the connector.

The processing unit 215 is used for managing a whole operation of the audio control unit 210 and/or the telephone 200, which is, for example, a central processing unit (CPU), a micro-processor or other programmable microprocessor, a digital signal processor (DSP), a programmable controller, an application specific integrated circuits (ASIC), a programmable logic device (PLD) or other similar device.

Referring to FIG. 3 and FIG. 4, in step S401, the detecting circuit 212 detects the audio transceiver through the connector 211 to generate a detecting voltage (S401). The operation that the detecting circuit 212 detects the audio transceiver through the connector 211 to generate the detecting voltage is described below with reference of FIG. 5.

Figure 5:
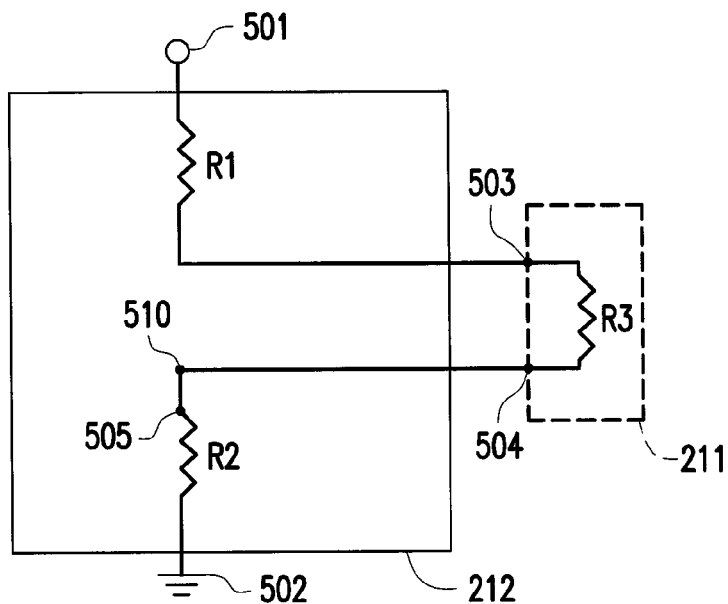
FIG. 5 is a schematic diagram of an equivalent circuit of a detecting circuit according to an embodiment of the invention.

FIG. 5 is a schematic diagram of an equivalent circuit of the detecting circuit according to an embodiment of the invention. Referring to FIG. 5, in the present embodiment, the detecting circuit 212 includes a resistor R1, a resistor R2 and a detecting node 510. A first terminal of the resistor R1 is coupled to a power supply 501, and a second terminal of the resistor R1 is coupled to a first terminal 503 of the connector 211. A first terminal of the resistor R2 is coupled to ground 502, and a second terminal 505 of the resistor R2 is coupled to a second terminal 504 of the connector 211.

The detecting node 510 is a circuit node between the second terminal 504 of the connector 211 and the second terminal 505 of the second resistor R2, and an electronic element connected to the detecting node 510 can receive (or detect) a voltage of such node. In other words, the detecting node 510 can also be the second terminal 504 of the connector 211 or the second terminal 505 of the resistor R2. The voltage detected at the detecting node 510 is varied according to whether the connector 211 is connected to the audio transceiver or according to a type of the audio transceiver connected to the connector 211.

To be specific, it is assumed that an audio transceiver is connected to the telephone 200, i.e. the audio transceiver is inserted into the connector 211, and is electrically connected to the connector 211, directly. Now, a voltage A is input from the power supply 501, and the voltage A has a voltage drop after crossing the resistor R1 and a microphone of the audio transceiver connected to the connector 211, and now the voltage value thereof is decreased to B (which is also referred to as the detecting voltage). Such phenomenon is equivalent to existence of an equivalent resistor (for example, the resistor R3 shown in FIG. 5) representing an internal resistance of the microphone of the audio transceiver. The equivalent resistor R3 is connected in series with the resistor R1 and the resistor R2, and the voltage A of the power supply 501 has a voltage drop after crossing the equivalent resistor R3. In other words, after the audio transceiver is connected to the connector 211, the equivalent resistor R3 exists in the circuit shown in FIG. 5, and a first terminal of the equivalent resistor R3 is connected to the first terminal 503 (i.e. the second terminal of the resistor R1) of the connector 211, and a second terminal of the equivalent resistor R3 is coupled to the second terminal 504 (i.e. the second terminal of the resistor R2) of the connector 211. Deduced by analogy, if none audio transceiver (or none other electronic device) is connected to the connector 211, none loop is generated, and the voltage detected at the detecting node 510 is 0 V.

In the present embodiment, the detecting node 510 can be set at between the second terminal 504 of the connector 211 and the second terminal 505 of the resistor R2 to measure a voltage (for example, the aforementioned voltage B, which is also referred to as the detecting voltage) between the second terminal 504 of the connector 211 and the second terminal 505 of the resistor R2. A magnitude of the detecting voltage reflects the voltage drop caused when a current flows through the equivalent resistor R3. Since none loop is generated in case that the connector 211 is not connected to any audio transceiver, the voltage detected at the detecting node 510 is 0 V, and is smaller than a voltage detected at the detecting node 510 when the connector 211 is connected to any audio transceiver. Therefore, the detecting voltage obtained in case that the connector 211 is not connected to any audio transceiver is smaller than the detecting voltage obtained in case that the connector 211 is connected to any audio transceiver.

For example, in case that none audio transceiver is connected, it is assumed that the voltage value input by the power supply 501 is 3.3 V, resistances of the resistor R1 and the resistor R2 are constant 1 KΩ, and a voltage value of the ground terminal is 0 V. if the connector 211 is not connected to any audio transceiver, since none loop is generated, the detecting voltage obtained at the detecting node 510 is 0 V.

On the other hand, in case that an audio transceiver is connected, if the other conditions are not changed, and the connector 211 is connected to the handset 130 (which is also referred to as the first audio transceiver), where a resistance of the equivalent resistor R3 of the first audio transceiver 130 is 2.2 KΩ, in this case, the obtained detecting voltage is 0.78 V.

Deduced by analogy, it is assumed that the other conditions are not changed, though the connector 211 is connected to the headset 140 (which is also referred to as the second audio transceiver), where a resistance of the equivalent resistor R3 of the second audio transceiver 140 is 1 KΩ, in this case, the obtained detecting voltage is 1.1 V. Namely, the detecting voltage of 0 V indicates that none audio transceiver is connected, the detecting voltage of 0.78 V indicates that the connected audio transceiver is the first audio transceiver 130, and the detecting voltage of 1.1 V indicates that the connected audio transceiver is the second audio transceiver 140.

According to the above description, it is known that in case that the connector 211 is not connected to any audio transceiver, the obtained detecting voltage is 0 V and is smaller than the detecting voltage (0.78 V) obtained when the connector 211 is connected to the first audio transceiver 130 or the detecting voltage (1.1 V) obtained when the connector 211 is connected to the second audio transceiver 140. Moreover, since different equivalent resistors R3 are obtained when the connector 211 is connected to the audio transceivers with different internal resistances, the detecting voltages of different values corresponding to different audio transceivers are obtained (in case that the resistor R1, the resistor R2 and the voltage of the power supply 501 are not changed). The difference of the detecting voltages may indicate the type of the currently connected audio transceiver (or indicate whether any audio transceiver is connected).

It should be noticed that in the present embodiment, the equivalent resistors R3 of the two different audio transceivers, the resistances of the resistor R1 and the resistor R2, the voltage value of the power supply 502 and the voltage value of the ground terminal 502 are only used as an example, which are not used for limiting the invention. For example, in other embodiments, the equivalent resistors R3 of the two different audio transceivers can be respectively 2.5 KΩ and 0.5 KΩ; the resistors R1 and R2 may have the same or different constant resistance values; the power supply 501 may input the voltage greater than or smaller than 3.3 V; and the voltage value of the ground terminal can be greater than 0, i.e. a manufacturer can design the aforementioned resistance values and voltage value according to an actual requirement.

Moreover, in the present embodiment, although the equivalent resistor R3 is mainly generated by the internal resistance of the microphone of the audio transceiver, the invention is not limited thereto. For example, in other embodiments, the equivalent resistor R3 of each of the audio transceivers connected to the connector 211 can also be a resistance value formed by one of the internal resistance of the microphone of each of the audio transceivers and the internal resistances of other electronic components in each of the audio transceivers or a combination thereof.

Referring to FIG. 3 and FIG. 4, after the detecting circuit 212 detects the audio transceiver through the connector 211 to generate the detecting voltage (S401), in step S403, the ADC 213 converts the detecting voltage into a digital code.

The ADC (A/D or A to D) 213 is a device used for converting an electrical signal of an analog form into a digital signal of a digital form. The ADC 213 can provide a signal for signal measurement, and a corresponding device thereof is a digital-to-analog converter (DAC). In the present embodiment, the ADC 213 is coupled to the detecting node 510, and converts the detecting voltage of the analogy form into a signal of the digital form (which is also referred to as a digital code) according to a predetermined rule, and transmits the converted digital code to the processing unit 215. In this way, the processing unit 215 can know the type of the audio transceiver currently connected to the telephone 200 according to the received digital code. Output of the digital code may adopt different coding structures. Generally, the digital code is presented in binary, though the invention is not limited thereto, and some devices may output the digital code in hexadecimal or a gray code (a cyclic code).

To be specific, in the present embodiment, the aforementioned predetermined rule is to set a detecting voltage threshold according to the voltage values of the detecting voltages corresponding to different audio transceivers that are pre-measured by the manufacturer. Then, the ADC 213 determines the type of the audio transceiver currently connected to the connector 211 (or determines that none audio transceiver is connected) by comparing the current detecting voltage and the detecting voltage threshold.

For example, it is assumed that the detecting voltage of 0 V indicates that none audio transceiver is connected; the detecting voltage of 0.78 V indicates that the connected audio transceiver is the first audio transceiver 130; the detecting voltage of 1.1 V indicates that the connected audio transceiver is the second audio transceiver 140. The aforementioned predetermined rule can be set as follows. If the voltage value of the detecting voltage obtained by the ADC 213 is 0 V, the ADC 213 transmits back a binary value of "00" to the processing unit 215 to notify the processing unit 215 that none audio transceiver is currently connected to the telephone 200. If the voltage value of the detecting voltage obtained by the ADC 213 is not 0 V, it represents that an audio transceiver is currently connected to the telephone 200, and the ADC 213 determines whether the voltage value of the obtained detecting voltage is greater than the detecting voltage threshold. If the voltage value of the detecting voltage obtained by the ADC 213 is not 0 V (corresponding to the detecting voltage of 1.1 V) and is greater than the detecting voltage threshold (the detecting voltage threshold can be 1 V that is slightly less than 1.1 V), the ADC 213 transmits back a binary value of "10" to the processing unit 215 to notify the processing unit 215 that the audio transceiver currently connected to the telephone 200 is the second audio transceiver 140. If the voltage value of the detecting voltage obtained by the ADC 213 is not 0 V (corresponding to the detecting voltage of 0.78 V) and is smaller than the detecting voltage threshold (1 V), the ADC 213 transmits back a binary value of "01" to the processing unit 215 to notify the processing unit 215 that the audio transceiver currently connected to the telephone 200 is the first audio transceiver 130. If the ADC 213 detects an extremely large or extremely small detecting voltage or the ADC 213 detects an error, the ADC 213 transmits a binary value of "11" to the processing unit 215 to notify the processing unit 215 that a current connecting state of the audio transceiver and the connector 211 is abnormal or the telephone 200 has an error.

It should be noticed that in the present embodiment, the ADC 213 is in charge of determining the type of the currently connected audio transceiver according to the predetermined rule, though the invention is not limited thereto. For example, in another embodiment, the ADC 213 only transmits a voltage value (a digital code) of the digital form to the processing unit 215, and the processing unit 215 determines the type of the audio transceiver currently connected to the connector 211 (or determines whether any audio transceiver is connected to the connector 211) according to the received digital code and the predetermined rule. In other words, in another embodiment, the digital code can also be a digital signal representing a voltage value of the current detecting voltage in the digital form, and the processing unit determines the status of the audio transceiver according to the received digital code and the predetermined rule (for example, the relationship between the aforementioned detecting voltage and the detecting voltage threshold and the aforementioned determination method).

In the present embodiment, the ADC 213 continuously transmits the digital code to the processing unit 215 to notify the processing unit 215 the type of the audio transceiver currently connected to the telephone 200, though the invention is not limited thereto. For example, in another embodiment, the ADC 213 periodically transmits the digital code to the processing unit 215 to notify the processing unit 215 the type of the audio transceiver currently connected to the telephone 200. For another example, in another embodiment, only after the ADC 213 receives a request instruction used for inquiring the type of the audio transceiver (or used for requesting the digital code corresponding to the detecting voltage) from the processing unit 215, the ADC 213 transmits the digital code to the processing unit 215 to reply the request instruction.

In the present embodiment, after the ADC 213 converts the detecting voltage into the digital code (S403), the digital code is transmitted to the processing unit 215. In step S405, the processing unit 215 identifies the audio transceiver according to the digital code, and controls the audio codec 214 to switch to the audio configuration adapted to the identified audio transceiver to process audio data of the audio transceiver.

Besides that the audio codec 214 implements functions of echo cancellation, noise cancellation, etc., it also implements the most important analog-to-digital conversion function and digital-to-analog conversion function. In an ideal situation, regarding a recording process, it only required to use an ADC to convert an analog audio signal obtained through a microphone of the audio transceiver into a digital audio signal and store the same as digital audio data. Regarding a process of playing audio data, it is only required to use a DAC to convert the digital audio data into an analog audio signal and output the same to a speaker of the audio transceiver for playing. However, in an actual process, the process of storing digital audio data is probably interfered by an external audio source, for example, attenuation of the signal caused by the microphone itself and noises introduced from an interface of the connector, etc., or during a process of playing the stored digital audio data, the finally output analog audio signal is probably incomplete due to an error of the digital audio data itself. For a simple example, when a user holds a handset to talk to other people, although the user talks while listening to the other people that talks from another end of the telephone, the user does not obviously hear his own voice from the handset, and this is the function of the audio codec 214.

In the present embodiment, as described above, the processing unit 215 controls the audio codec 214 to switch to the audio configuration adapted to the identified audio transceiver to process the audio data of the audio transceiver. To be specific, in the present embodiment, the audio codec 214 provides at least two audio configurations corresponding to the two audio transceivers. One of the audio configurations is as follows. When the processing unit 215 determines that the audio transceiver is the first audio transceiver 130, the processing unit 215 switches an audio gain of the audio codec 214 to a first audio gain corresponding to the first audio transceiver 130, and switches an audio channel of the audio codec 214 to a first audio channel corresponding to the first audio transceiver 130. Another one of the audio configurations is as follows. When the processing unit 215 determines that the audio transceiver is the second audio transceiver 140, the processing unit 215 switches the audio gain of the audio codec 214 to a second audio gain corresponding to the second audio transceiver 140, and switches the audio channel of the audio codec 214 to a second audio channel corresponding to the second audio transceiver 140.

Based on the aforementioned operation of setting the audio gain of the audio codec 214 to the audio gain corresponding to (matching) the connected audio transceiver, the audio gain can be adapted to the audio transceiver. Therefore, the audio codec 214 may use the matched audio gain to amplify the analog audio signal input from the audio transceiver, so as to facilitate converting the same into the digital audio signal. Meanwhile, the audio codec 214 may use the matched audio gain to convert the digital audio data and output the same as a proper analog audio signal.

Similarly, based on the aforementioned operation of setting the audio channel of the audio codec 214 to the audio channel corresponding to (matching) the connected audio transceiver, the audio channel can be adapted to the audio transceiver, and the audio data can be properly converted to an analog form corresponding to the connected audio transceiver for outputting or converted to a digital form corresponding to the connected audio transceiver for inputting, for example, corresponding conversion of different audio channels between a mono channel and dual channels.

Figure 6:
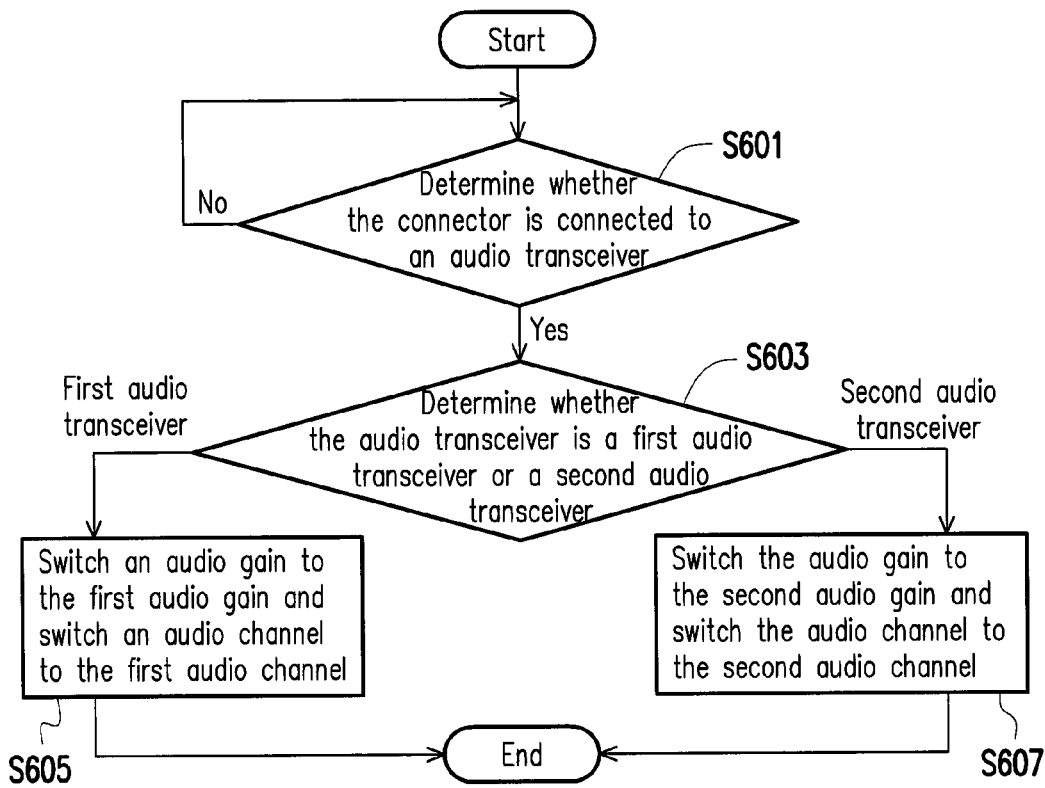
FIG. 6 is a flowchart illustrating an audio control method according to an embodiment of the invention.

FIG. 6 is a flowchart illustrating an audio control method according to an embodiment of the invention. Referring to FIG. 2 and FIG. 6, in step S601, the processing unit 215 determines whether the connector 211 is connected to an audio transceiver. As described above, the ADC 213 in the audio control unit 210 determines whether to output a digital code "00" to the processing unit 215 by determining whether a voltage value of the detecting voltage obtained by the ADC 213 is equal to 0, and the processing unit 215 determines whether an audio transceiver is connected. If the connector 211 is connected to an audio transceiver, the flow goes to a step S603 from the step S601, by which the processing unit 215 determines whether the audio transceiver is a first audio transceiver or a second audio transceiver. As described above, the ADC 213 can output the digital code to the processing unit 215 by determining whether the voltage value of the detecting voltage obtained by the ADC 213 is smaller than the detecting voltage threshold, and the processing unit 215 identifies whether the audio transceiver is the first audio transceiver or the second audio transceiver. If the connect 211 is not connected to any audio transceiver, the step S601 is repeated to continuously determine whether the connector 211 is connected to an audio transceiver.

In the step S603, when the processing unit 215 determines that the audio transceiver is the first audio transceiver, the flow goes to a step S605 from the step S603, by which the processing unit 215 switches the audio gain to the first audio gain and switches the audio channel to the first audio channel, and ends the whole flow of the audio control method. In the step S603, when the processing unit 215 determines that the audio transceiver is the second audio transceiver, the flow goes to a step S607 from the step S603, by which the processing unit 215 switches the audio gain to the second audio gain and switches the audio channel to the second audio channel, and ends the whole flow of the audio control method.

It should be noticed that in the present embodiment, the ADC 213 and the audio codec 214 are implemented by hardware circuits, though the invention is not limited thereto, and program cods or software can be used to implement the functions of the ADC and the audio codec. For example, the functions of the ADC 213 and the audio codec 214 can be implemented by an ADC module and an audio codec module composed of a plurality of program codes. Moreover, the ADC module and the codec module can be executed by the processing unit 215 to implement the functions of the ADC 213 and the audio codec 214.

In summary, according to the telephone and the audio control method used by the telephone of the invention, the detecting voltage corresponding to the audio transceiver can be generated by detecting the audio transceiver connected to the telephone, and the detecting voltage is converted into a digital code. Then, the audio transceiver is identified according to the digital code, and the audio codec is controlled to switch to the audio configuration adapted to the identified audio transceiver to process audio data of the audio transceiver. In this way, according to the embodiment of the invention, a single connector can be used to implement functions of dual connectors, and meanwhile at least two audio transceiver connected to the telephone can be identified. Therefore, in the telephone and the audio control method used by the telephone of the invention, besides that it is unnecessary to use a button to switch the audio transceivers, a good voice quality is maintained under a premise of reducing a whole volume of the telephone and reducing a mechanism and circuit design cost of the telephone.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A telephone, comprising:
    a connector, connected to an audio transceiver;
    a detecting circuit, coupled to the connector, and detecting the audio transceiver through the connector to generate a detecting voltage; and
    an audio control unit, comprising:
        an analog-to-digital converter, coupled to the detecting circuit, converts the detecting voltage into a digital code;
        an audio codec, coupled to the detecting circuit, provides at least two audio configurations;
        a processing unit, coupled to the analog-to-digital converter and the audio codec, identifies the audio transceiver according to the digital code, and controls the audio codec to switch to the audio configuration corresponding to the identified audio transceiver to process an audio of the audio transceiver,
    wherein the detecting circuit comprises:
        a first resistor, having a first terminal coupled to a first power supply, and a second terminal coupled to a first terminal of the connector;
        a second resistor, having a first terminal coupled to a ground terminal, and a second terminal coupled to a second terminal of the connector, and
        a detecting node, coupled to the analog-to-digital converter, and configured between the second terminal of the connector and the second terminal of the second resistor, wherein the analog-to-digital converter obtains the detecting voltage between the connector and the second resistor through the detecting node.

2. The telephone as claimed in claim 1, wherein the audio configurations comprise a first audio gain and a first audio channel corresponding to a first audio transceiver and a second audio gain and a second audio channel corresponding to a second audio transceiver,
    wherein when the processing unit determines the audio transceiver to be the first audio transceiver, the processing unit controls the audio codec to switch an audio gain to the first audio gain and switch an audio channel to the first audio channel; and
    when the processing unit determines the audio transceiver to be the second audio transceiver, the processing unit controls the audio codec to switch the audio gain to the second audio gain and switch the audio channel to the second audio channel.

3. The telephone as claimed in claim 1, wherein the analog-to-digital converter determines whether the detecting voltage is smaller than a detecting voltage threshold,
    wherein when the analog-to-digital converter determines that the detecting voltage is smaller than the detecting voltage threshold, the analog-to-digital converter outputs a first digital code to the processing unit, and the processing unit identifies the audio transceiver to be the first audio transceiver according to the first digital code; and
    when the analog-to-digital converter determines that the detecting voltage is not smaller than the detecting voltage threshold, the analog-to-digital converter outputs a second digital code to the processing unit, and the processing unit identifies the audio transceiver to be the second audio transceiver according to the second digital code.

4. The telephone as claimed in claim 1, wherein the processing unit determines whether the digital code is smaller than a detecting voltage threshold,
    wherein when the digital code is smaller than the detecting voltage threshold, the processing unit identifies the audio transceiver to be the first audio transceiver; and
    when the digital code is not smaller than the detecting voltage threshold, the processing unit identifies the audio transceiver to be the second audio transceiver.

5. An audio control method, adapted to a telephone having a connector, a detecting circuit, an analog-to-digital converter and an audio codec, wherein the audio codec provides at least two audio configurations, the audio control method comprising:

detecting, by the detecting circuit, an audio transceiver connected to the connector to generate a detecting voltage;
  converting, by the analog-to-digital converter, the detecting voltage into a digital code; and
  identifying the audio transceiver according to the digital code, and controlling the audio codec to switch to the audio configuration corresponding to the identified audio transceiver to process an audio of the audio transceiver,
  wherein the detecting circuit comprises:
    a first resistor, having a first terminal coupled to a first power supply, and a second terminal coupled to a first terminal of the connector;
    a second resistor, having a first terminal coupled to a ground terminal, and a second terminal coupled to a second terminal of the connector; and
    a detecting node, coupled to the analog-to-digital converter, and configured between the second terminal of the connector and the second terminal of the second resistor, wherein the analog-to-digital converter obtains the detecting voltage between the connector and the second resistor through the detecting node.

6. The audio control method as claimed in claim 5, wherein the audio configurations comprise a first audio gain and a first audio channel corresponding to a first audio transceiver and a second audio gain and a second audio channel corresponding to a second audio transceiver, and the step of controlling the audio codec to switch to the audio configuration adapted to the identified audio transceiver to process the audio of the audio transceiver comprises:

switching an audio gain to the first audio gain and switching an audio channel to the first audio channel when the audio transceiver is determined to be the first audio transceiver; and
  switching the audio gain to the second audio gain and switching the audio channel to the second audio channel when the audio transceiver is determined to be the second audio transceiver.

7. The audio control method as claimed in claim 5, wherein the step of converting the detecting voltage into the digital code, and identifying the audio transceiver according to the digital code comprises:

determining whether the detecting voltage is equal to 0 V; and
  outputting a first digital code when the detecting voltage is determined to be 0 V, and identifying that the connector is not connected to the audio transceiver according to the first digital code.

8. The audio control method as claimed in claim 5, wherein the step of converting the detecting voltage into the digital code, and identifying the audio transceiver according to the digital code comprises:

determining whether the detecting voltage is equal to 0 V;
  determining whether the detecting voltage is smaller than a detecting voltage threshold when the detecting voltage is determined to be not equal to 0 V;
  outputting a second digital code when the detecting voltage is determined to be smaller than the detecting voltage threshold, and identifying the audio transceiver to be a first audio transceiver according to the second digital code; and
  outputting a third digital code when the detecting voltage is determined to be not smaller than the detecting voltage threshold, and identifying the audio transceiver to be a second audio transceiver according to the third digital code.

9. The audio control method as claimed in claim 5, wherein the step of converting the detecting voltage into the digital code, and identifying the audio transceiver according to the digital code comprises:

determining whether the digital code is equal to 0;
  identifying that the connector is not connected to the audio transceiver when the digital code is determined to be equal to 0;
  identifying that the connector is connected to the audio transceiver when the digital code is determined to be not equal to 0; and determining whether the digital code is smaller than a detecting voltage threshold;
  identifying the audio transceiver to be a first audio transceiver when the digital code is determined to be smaller than the detecting voltage threshold; and
  identifying the audio transceiver to be a second audio transceiver when the digital code is determined to be not smaller than the detecting voltage threshold.

\* \* \* \* \*